(12) United States Patent
Lee

(10) Patent No.: US 7,398,327 B2
(45) Date of Patent: Jul. 8, 2008

(54) APPARATUS, METHOD AND SYSTEM FOR PROVIDING AUTOMATED SERVICES TO HETEROGENOUS DEVICES ACROSS MULTIPLE PLATFORMS

(75) Inventor: Aaron Lee, Mountainview, CA (US)

(73) Assignee: Robert Bosch GmbH, Stuttgart (DE)

( * ) Notice: Subject to any disclaimer, the term of this patent is extended or adjusted under 35 U.S.C. 154(b) by 839 days.

(21) Appl. No.: 10/723,747

(22) Filed: Nov. 25, 2003

(65) Prior Publication Data

US 2005/0114534 A1    May 26, 2005

(51) Int. Cl.
*G06F 15/16* (2006.01)
(52) U.S. Cl. .................. 709/250; 709/205; 709/213
(58) Field of Classification Search .............. 709/250, 709/205, 213
See application file for complete search history.

(56) References Cited

U.S. PATENT DOCUMENTS

| | | | |
|---|---|---|---|
| 6,151,501 A | 11/2000 | Belkin et al. | |
| 6,304,881 B1 | 10/2001 | Halim et al. | |
| 6,330,568 B1 | 12/2001 | Boothby et al. | |
| 6,370,449 B1 | 4/2002 | Razavi et al. | |
| 6,405,218 B1 | 6/2002 | Boothby | |
| 6,446,070 B1 | 9/2002 | Arnold et al. | |
| 6,532,480 B1 | 3/2003 | Boothby | |
| 2001/0032335 A1* | 10/2001 | Jones | 725/105 |
| 2003/0041125 A1* | 2/2003 | Salomon | 709/220 |
| 2004/0001565 A1* | 1/2004 | Jones et al. | 375/354 |
| 2005/0060365 A1* | 3/2005 | Robinson et al. | 709/203 |
| 2007/0067356 A1* | 3/2007 | Mills et al. | 707/201 |

* cited by examiner

*Primary Examiner*—John Follansbee
*Assistant Examiner*—Nghi V Tran
(74) *Attorney, Agent, or Firm*—Kenyon & Kenyon LLP

(57) ABSTRACT

A system to provide automated services to heterogeneous devices in a network environment, which includes a device agent residing on each of the heterogeneous devices, a device communicator to register and synchronize the devices via each of the device agents, and a portal server to interface multiple content sources on behalf of the devices, wherein the devices communicate with the portal server via each of the device agents and the device communicator.

28 Claims, 14 Drawing Sheets

Subscriber:
1. Connect to the MoM server
2. Subscribe( <key>, <qos> )
   // <key> contains the oid (object id), data type and other book-keeping info
   // <qos> contains optional priority or login session information
3. Register a callback method
4. ....
5. Unsubscribe( <key> ) // not interested any more
6. Disconnect

Publisher
1. Connect to the MOM server
2. Publish( <message> ) // <message> = [<key>, <qos>, <data>]
3. Erase( <key> ) // erase any messages which has the same <key>
4. Disconnect

Figure 6

APPARATUS, METHOD AND SYSTEM FOR PROVIDING AUTOMATED SERVICES TO HETEROGENOUS DEVICES ACROSS MULTIPLE PLATFORMS

FIELD OF THE INVENTION

The present application relates to an apparatus, method and system for providing automated services to heterogeneous devices across multiple platforms, including while maintaining a consistent synchronized state.

BACKGROUND INFORMATION

As computing technology advances, the number of personal devices, communications protocols, and diversity of connectivity choices may increase. In particular, these devices may include, for example, a desktop personal computer (PC), a laptop computer, a personal data assistant (PDA), a cellular telephone, a GPS in-car navigation system, a digital camera, a MP3 player, and other devices. The choice of protocol may include, for example, Hypertext Transfer Protocol (HTTP), File Transfer Protocol (FTP), Simple Network Management Protocol (SNMP), Internet Inter-Orb Protocol (IIOP) in Common Object Request Broken Architecture (CORBA), Simple Object Access Protocol (SOAP) with Extension Markup Language (XML), or any other appropriate protocol. The choice of connectivity may include, for example, Ethernet, Bluetooth, IEEE 802.11 a/b/g (WiFi), ZigBee, Infrared Detection and Acquisition (IrDA), General Packet Radio Service (GPRS), Code Division Multiplexed Access (CDMA), and Global System for Mobile Communication (GSM).

These devices, however, may not communicate directly with each other, because, for example, they may not support a common communication protocol or they may be implemented in different programming languages. As devices become smaller, less expensive, prolific, and more focused on a single application, device interoperability may pose a greater challenge. Even if a device can communicate via multiple protocols, the ability to move to new standards may remain problematic and difficult to achieve.

Each of the devices may have different computation power, screen sizes, computation power, and connection capabilities, and hence connecting these devices to each other and other networks, such as, for example, the Internet or any other network, may require a significant amount of programming and manual synchronization to achieve consistent states. Providing services to these devices may be difficult and may demand a significant programming effort and infrastructure.

For rapid application development, a standard platform may be desired so that programmers may focus on application development rather than dealing with multiple languages and/or multiple connectivity issues. In this regard, the underlying operating system and system libraries of the standard platform may provide an abstraction or simplified interface to shield the multiple connection protocols and hardware-specific details. However, a suitable standard platform for devices may be lacking in that for each new software application written, a significant amount of programming effort may be required to deal with device-specific details, which may prolong application development and limit the deployment of the application to other devices.

Other challenges may exist as well to provide services to devices. In particular, providing services to mobile devices via a wireless network may also pose a challenge, due to delay and availability constraints, for example. In particular, delay constraints may arise due to limited bandwidth, packet loss, and backbone delay, which may present difficult challenges to engineers who may have limited or no control over these constraints. Public backbones, such as, for example, the Internet or cellular networks, may be highly latent and may provide only limited coverage. Hence, mobile applications may be required to work in a not-always-on environment, using a network only when it's available.

SUMMARY OF THE INVENTION

An exemplary embodiment and/or exemplary method of the present invention may provide Automated Services to heterogeneous devices Across multiple Platforms (ASAP) while maintaining a consistent synchronized state. The heterogeneous devices may include, for example, a personal data assistance (PDA), a wireless device, a mobile telephone, a handheld Global Positioning System (GPS) unit, an in-car navigation system, a digital camera, a MP3 player, a desktop computer, a laptop computer, a printer, a digital video recording device, a home appliance, or any other heterogeneous device. In this regard, an exemplary ASAP system may deliver software (applications), services (transactions) and data (personal profiles and application data) over wide and local area networks, and may provide transparent device-to-device and device-to-services connections without actively initiating connections to services providers. Moreover, the exemplary ASAP system may better address the issues of delay and latency, and may provide asynchronous messaging to update with server when the network is available.

An exemplary ASAP method and/or system may provide automatic registration of devices.

An exemplary ASAP method and/or system may provide automatic synchronization between devices so that data may be kept as current or up-to-date as possible.

An exemplary ASAP method and/or system may provide automatic discovery of device capabilities.

An exemplary ASAP method and/or system may provide a simplified application programming interface (API) to hide much of the protocol and connectivity details required to access services so that the burden of programming may be reduced. In this regard, the ASAP system may use a markup language (such as, for example, the Extension Markup Language (XML)) or a reduced/compressed version thereof.

An exemplary ASAP method and/or system may use a platform for deploying and managing applications in a coordinated fashion, such as, for example, the Open Systems Gateway interface (OSGi). In this regard, the use of OSGi may provide enhanced exchange services, such as bundles. In particular, OSGi may be utilized to provide, for example, a well-defined and protected execution environment for bundles, additional life cycle management, persistent data storage, version management, etc.

An exemplary ASAP method and/or system may also provide anonymous services through a web portal (which may act as a proxy for the user to consume other web services) to devices of interest using, for example, a message oriented architecture.

An exemplary ASAP method and/or system may also provide a mechanism to connect distributed services in a peer-to-peer network. In this regard, an exemplary ASAP system may use a markup language (such as, for example, the Extention Markup Language (XML)) as an underlying messaging interface format and may define a set of protocols for data exchange and service request/response. ASAP is intended, however, to be implementable in any language.

An exemplary ASAP method and/or system may utilize, for example, Jini network technology to connect distributed services within a Java network. In particular, the exemplary ASAP system may use a centralized service location broker.

An exemplary embodiment is directed to a system to provide automated services to heterogeneous devices in a network environment, in which the system includes a device agent residing on each of the heterogeneous devices, a device communicator to register and synchronize the devices via each of the device agents, and a portal server to interface multiple content sources on behalf of the devices, wherein the devices communicate with the portal server via each of the device agents and the device communicator.

Another exemplary embodiment is directed to a system to provide automated services to heterogeneous devices in a network environment, in which at least two of the devices support different protocols and connectivities.

Yet another exemplary embodiment is directed to a system to provide automated services to heterogeneous devices in a network environment, in which the devices include at least one of a desktop computer, a laptop computer, a wireless device, a personal data assistant, a handheld GPS unit, an in-car navigation system, a cellular telephone, a digital camera, a MP3 player, a digital video recording device, a printer, and a home appliance having a processor.

Still another exemplary embodiment is directed to a system to provide automated services to heterogeneous devices in a network environment, in which the services include at least one of downloading data and providing data synchronization.

Yet another exemplary embodiment is directed to a system to provide automated services to heterogeneous devices in a network environment, in which the services include at least one of locating a service provider, ordering at least one of a product and a service, purchasing at least one of the product and the service, locating a nearby service establishment, downloading information, and updating information.

Still another exemplary embodiment is directed to a system to provide automated services to heterogeneous devices in a network environment, in which the network environment includes at least one of a wired connection and a wireless connection.

Yet another exemplary embodiment is directed to a system to provide automated services to heterogeneous devices in a network environment, in which the network environment includes at least one of a personal area network, a local area network, and a wide area network.

Still another exemplary embodiment is directed to a system to provide automated services to heterogeneous devices in a network environment, in which the device agent provides a single unified messaging interface.

Yet another exemplary embodiment is directed to a system to provide automated services to heterogeneous devices in a network environment, in which the single messaging interface is one of an XML interface and a compressed XML interface.

Still another exemplary embodiment is directed to a system to provide automated services to heterogeneous devices in a network environment, in which the single unified messaging interface allows future expansion capabilities without a fixed binding of a function call for an application programming interface.

Yet another exemplary embodiment is directed to a system to provide automated services to heterogeneous devices in a network environment, in which the device communicator is configured to store device capabilities during a registration of the devices.

Still another exemplary embodiment is directed to a system to provide automated services to heterogeneous devices in a network environment, in which the device capabilities include a connectivity capability.

Yet another exemplary embodiment is directed to a system to provide automated services to heterogeneous devices in a network environment, in which the connectivity capability includes at least one of a ZigBee, a Bluetooth, an IrDA, a GPRS, a GSM, a CDMA, and an Ethernet capability.

Still another exemplary embodiment is directed to a system to provide automated services to heterogeneous devices in a network environment, in which the device capabilities include at least one supported protocol.

Yet another exemplary embodiment is directed to a system to provide automated services to heterogeneous devices in a network environment, in which the at least one supported protocol includes at least one of HTTP, FTP, SNMP, SOAP, XML, RMI, and IIOP/CORBA.

Still another exemplary embodiment is directed to a system to provide automated services to heterogeneous devices in a network environment, in which the device capabilities include at least one of a memory size, a screen size, a computing power, a storage capability, an audio capability, and a video capability.

Yet another exemplary embodiment is directed to a system to provide automated services to heterogeneous devices in a network environment, in which the device communicator is configured to deliver software updates to the devices via the device agent.

Still another exemplary embodiment is directed to a system to provide automated services to heterogeneous devices in a network environment, in which the device communicator is configured to deliver the software updates when the device is available.

Yet another exemplary embodiment is directed to a system to provide automated services to heterogeneous devices in a network environment, in which the portal server is configured to at least one of aggregate and cache data from the multiple content sources.

Still another exemplary embodiment is directed to a system to provide automated services to heterogeneous devices in a network environment, in which the portal server is configured to maintain data persistency so that devices that are not always on have access to a most recent snapshot.

Yet another exemplary embodiment is directed to a system to provide automated services to heterogeneous devices in a network environment, in which at least one of the multiple content sources resides on a wide area network.

Still another exemplary embodiment is directed to a system to provide automated services to heterogeneous devices in a network environment, in which the at least one of the multiple content sources resides on the Internet.

An exemplary method is directed to providing automated services to heterogeneous devices in a network environment across multiple platforms, including providing a single messaging interface on each device via a device agent which communicates with a device communicator via a device-specific connectivity and communication protocol, registering each of the devices via the device communicator to record device capabilities of each of the devices, aggregating data from multiple content sources via a portal server, caching the data, and downloading and synchronizing the data via the device communicator.

An exemplary method is directed to providing automated services to heterogeneous devices in a network environment across multiple platforms includes issuing a service request via the single messaging interface, sending the request from the device agent to the device communicator, modifying the request to conform to the network environment, forwarding the request to a service provider via the portal server, and receiving a reply from the service provider via the portal server.

Another exemplary embodiment is directed to providing automated services to heterogeneous devices in a network environment across multiple platforms, in which the system includes a single messaging interface on each device via a device agent which communicates with a device communicator via a device-specific connectivity and communication protocol, an arrangement to register each of the devices via the device communicator to record device capabilities of each of the devices, an arrangement to aggregate data from multiple content sources via a portal server, an arrangement to cache the data, and an arrangement to download and synchronize the data via the device communicator.

Yet another exemplary embodiment is directed to providing automated services to heterogeneous devices in a network environment across multiple platforms, in which the system includes an arrangement to issue a service request via the single messaging interface, an arrangement to send the request from the device agent to the device communicator, an arrangement to modify the request to conform to the network environment, an arrangement to forward the request to a service provider via the portal server, and an arrangement to receive a reply from the service provider via the portal server.

BRIEF DESCRIPTION OF THE DRAWINGS

FIG. 6 shows pseudo code to implement an exemplary subscriber/publisher control flow.

DETAILED DESCRIPTION

Figure 1A:
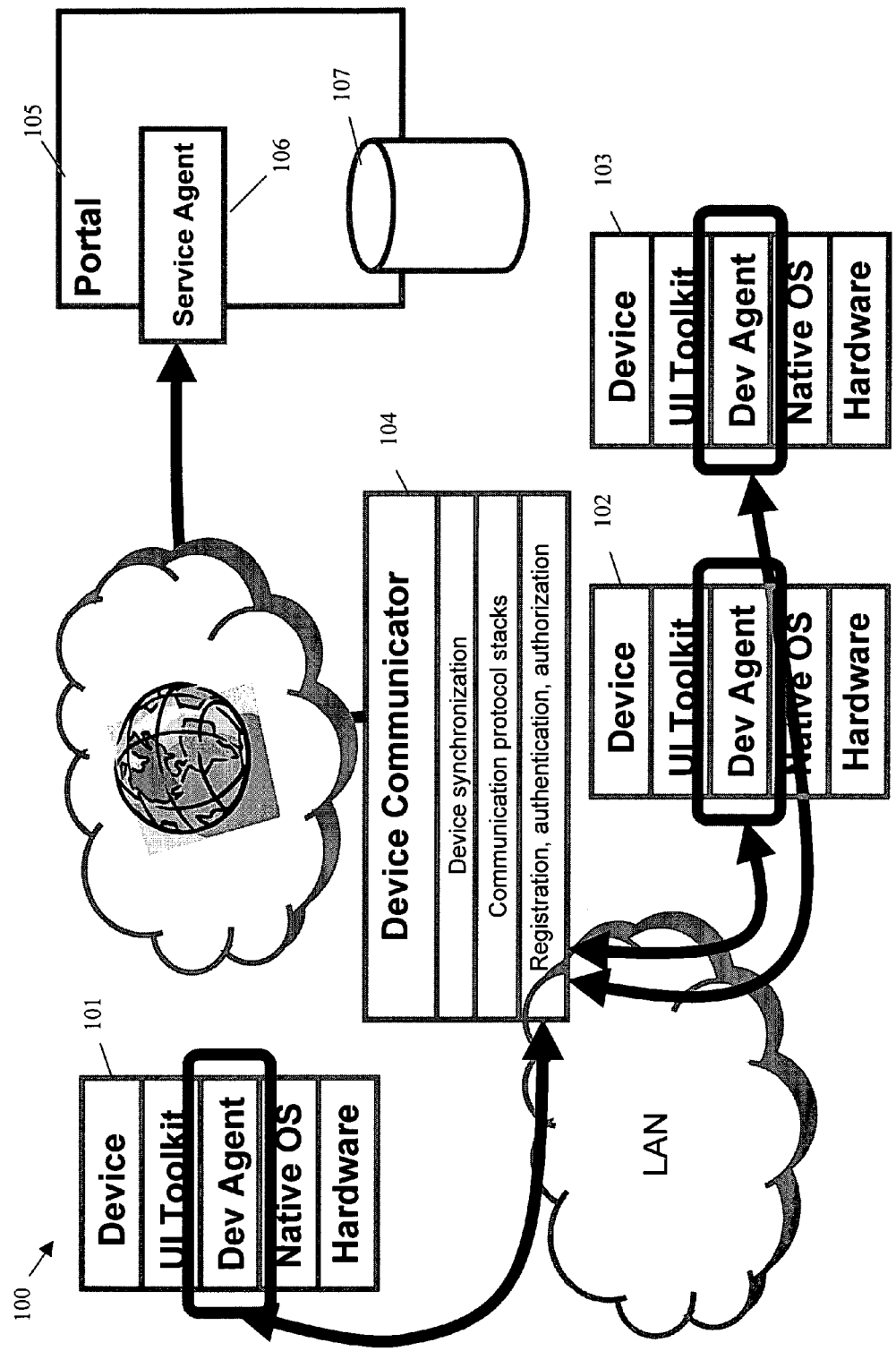
FIG. 1A shows an exemplary system architecture for providing Automated Services to heterogeneous devices Across multiple Platforms (ASAP).

FIG. 1A shows an exemplary system architecture 100 for Automated Services Across multiple Platforms (ASAP), which includes three devices 101, 102, and 103, a device communicator 104, a portal server 105, a service agent 106, and a database 107.

The devices 101, 102, and 103 include a layer of device-specific software, the so-called device agent, which supports a common language (such as, for example, the Extension Markup Language (XML)) to interface with the device communicator 104. The device communicator 104 acts as a gateway or moderator to coordinate the devices 101, 102, and 103 in a local network neighborhood. The device communicator 104 supports multiple communication protocols and connectivity standards so that it may talk to other devices in one language (e.g., XML) but using different protocols and/or connectivity standards (such as, for example, Hypertext Transfer Protocol (HTTP), File Transfer Protocol (FTP), Simple Network Management Protocol (SNMP), Internet Inter-Orb Protocol (IIOP) in Common Object Request Broken Architecture (CORBA), Simple Object Access Protocol (SOAP) with Extension Markup Language (XML), Ethernet, Bluetooth, IEEE 802.11 a/b/g (WiFi), ZigBee, Infrared Detection and Acquisition (IrDA), General Packet Radio Service (GPRS), Code Division Multiplexed Access (CDMA), and Global System for Mobile Communication (GSM), or any other appropriate communications protocol or connectivity standard). The device communicator 104 also performs device registration, synchronization, and user authentication and authorization. The device agent provides the application programmer with a "simplified" way of communicating with the device communicator 104. The device communicator 104 provides a seamless integration and synchronization among the devices 101, 102, and 103 in the local area network. Hence, instead of connecting individual devices directly (point-to-point) to a network, such as, for example, the Internet, to obtain services, the device communicator 104 provides a "middleware" solution that hides protocol and connectivity details from the device. Consequently, services from the Internet, for example, may be provided without being concerned about future development of new protocols, services, and connectivity.

To obtain services from external sources, the device communicator 104 makes a request based on the information collected from the multiple devices 101, 102, and 103 via the device agent and issues the request to the portal server 105. In this regard, it may be assumed that the device communicator 104 has a better capability in making the request to obtain web services. The portal server 105 acts as a proxy/gateway to request, consume, and/or distribute web services from a variety of content sources. In this regard, the identity of the person may be protected because the portal server 105 issues the service request on the behalf of the user via a service agent 106. Also, a variety of services may be aggregated and cached, thus providing a faster response time and better use of network bandwidth. For example, if user A requests today's weather at a certain zip code and user B within the same zip happens to make the same request, the result may be immediately be returned.

The portal server 105 may store information regarding the devices and/or service providers. In this regard, the portal server 105 may include a user profile database 107 that maintains an updated copy of the user profile and application data so that intelligent content services and synchronization among different devices may be provided. In a wireless network environment, availability may not always be guaranteed so that another mechanism, such as, for example, a queue structure, may be required to save the data, profiles, and results for later retrieval.

According to an exemplary embodiment of the ASAP system, a PDA device equipped with, for example, an IEEE 802.11b compliant interface may check and send Short Message Service (SMS) messages via the device communicator 104 without the need to connect it to or line up infrared ports with a cellular telephone. In this regard, the device communicator 104 may communicate with the cellular telephone on behalf of the PDA device.

According to another exemplary embodiment, the device communicator 104 supports both the IEEE 802.11b and Bluetooth standards.

According to another exemplary embodiment the communication messages between devices 101, 102, 103, the device communicator 104, and/or the portal server 105 may be compressed to increase the data transfer rate. In particular, the data compression may be required to meet bandwidth constraints.

According to another exemplary embodiment the communication between devices 101, 102, 103, the device communicator 104, and/or the portal server 105 may be encrypted so that security of the exchanged data may be increased.

Figure 1B:
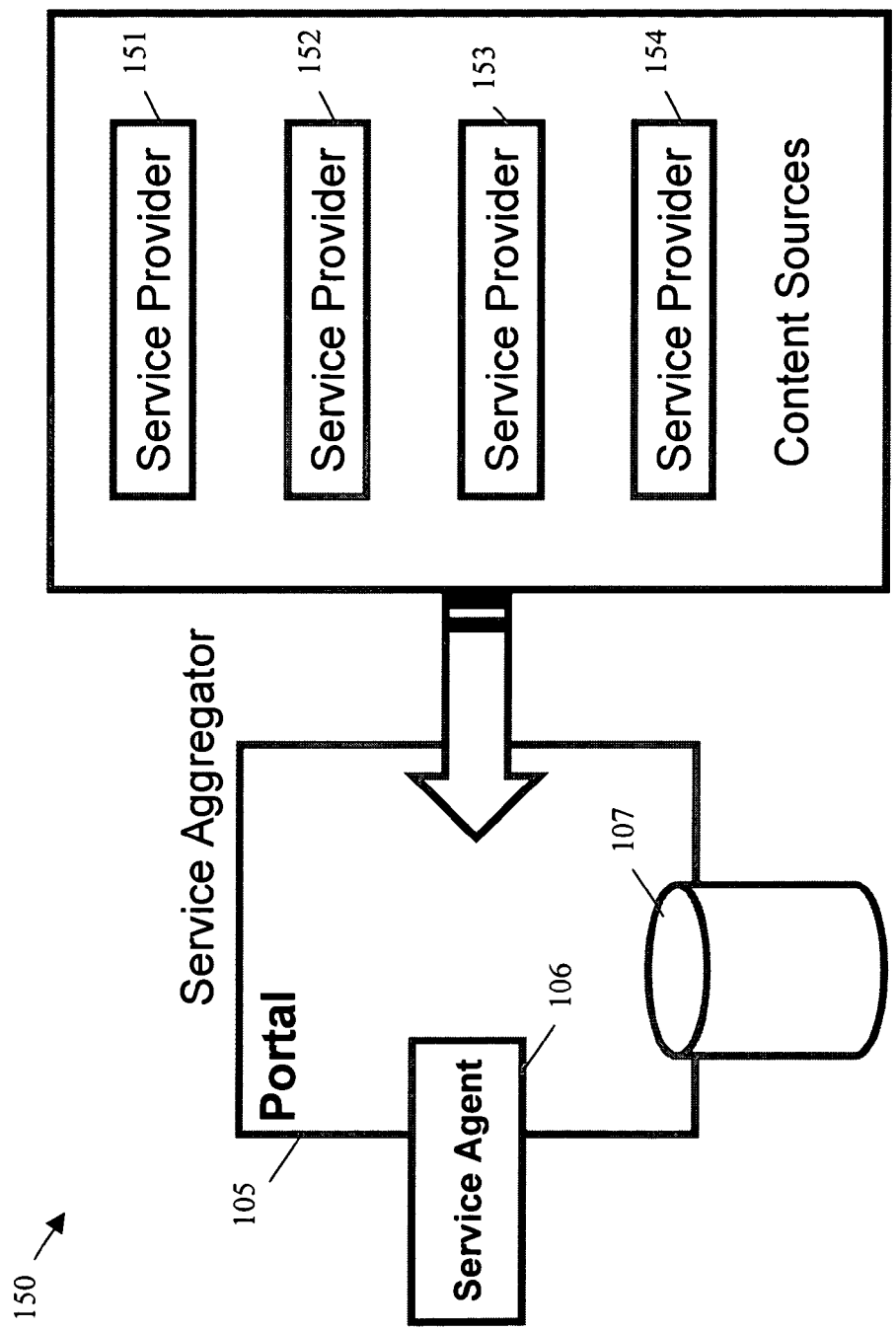
FIG. 1B shows an exemplary aggregation performed by the portal server.

FIG. 1B shows an exemplary aggregation 150 performed by the portal server 105 of content data from service providers 151 through 152, which may include for example, a web-based directory (e.g., "yellow" or "white" pages listings available via yahoo.com), a geographic map/locator service, an airline reservation system, a hotel reservation system, a ticket purchasing system, a web-based server, a commercial web site, a gaming service, etc. Unlike a client/server approach which may only provide content data in a non-flexible and/or complicated format for all devices, the portal server 105 aggregates content data in a manner that is "personalized" or configured with as to the registered capabilities of the device so that a diverse set of devices may be supported across multiple platforms.

Figure 2A:
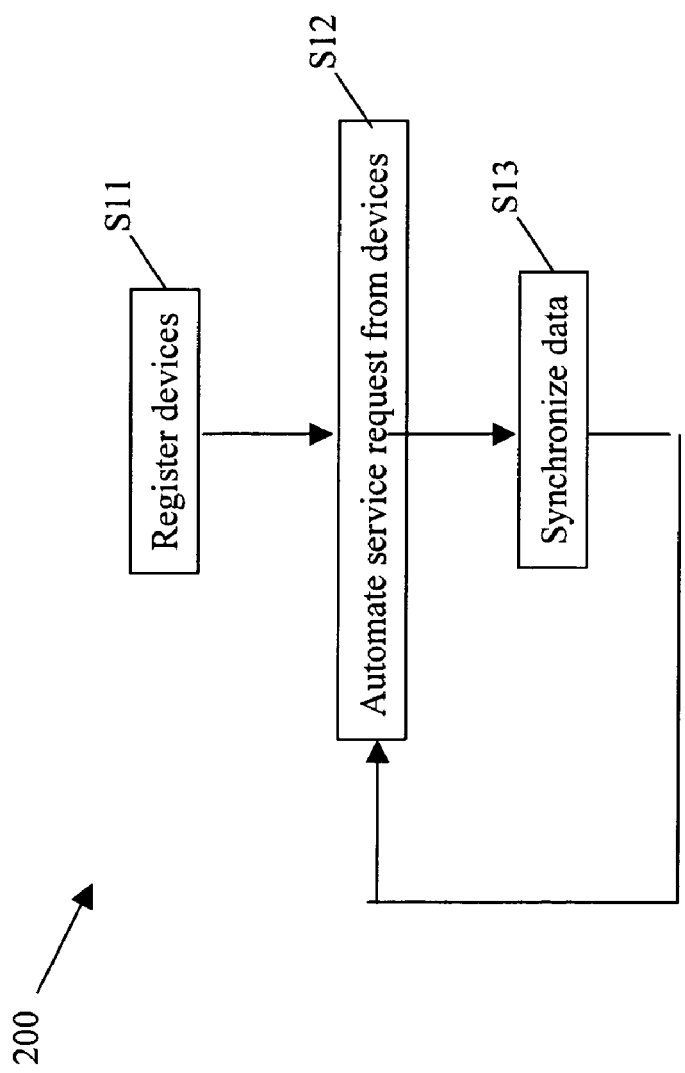
FIG. 2A shows an exemplary method according to the present invention.

FIG. 2A shows an exemplary method 200 according to the present invention. In step S11, the devices 101, 102, and 103 register with the device communicator 104 providing information regarding the capabilities of the device, including, for example, memory size, processing capacity, and supported protocols and connectivities. In step S12, the device communicator 104 processes service requests from the devices 101, 102, and 103. In this regard, the device communicator 104 may enhance the service requests and/or combine them collectively before issuing the request to a service agent 106 which interfaces with one or more service providers 151 to 154. Upon receiving one or more responses from the service providers 151 to 154 via the service agent 106, the device communicator 104 "tailors" it to suit the proper device capability before relaying it the appropriate device. Hence, the devices 101, 102, and 103, issue requests on behalf of themselves and receive responses individually according to their particular capabilities while the device communicator 104 customizes and combines requests/responses to simplify and/or improve communication efficiency. Moreover, in step S13, data is automatically synchronized to maintain a consistent state of the devices, regardless, for example, of network availability and/or unreliable networks.

Figure 2B:
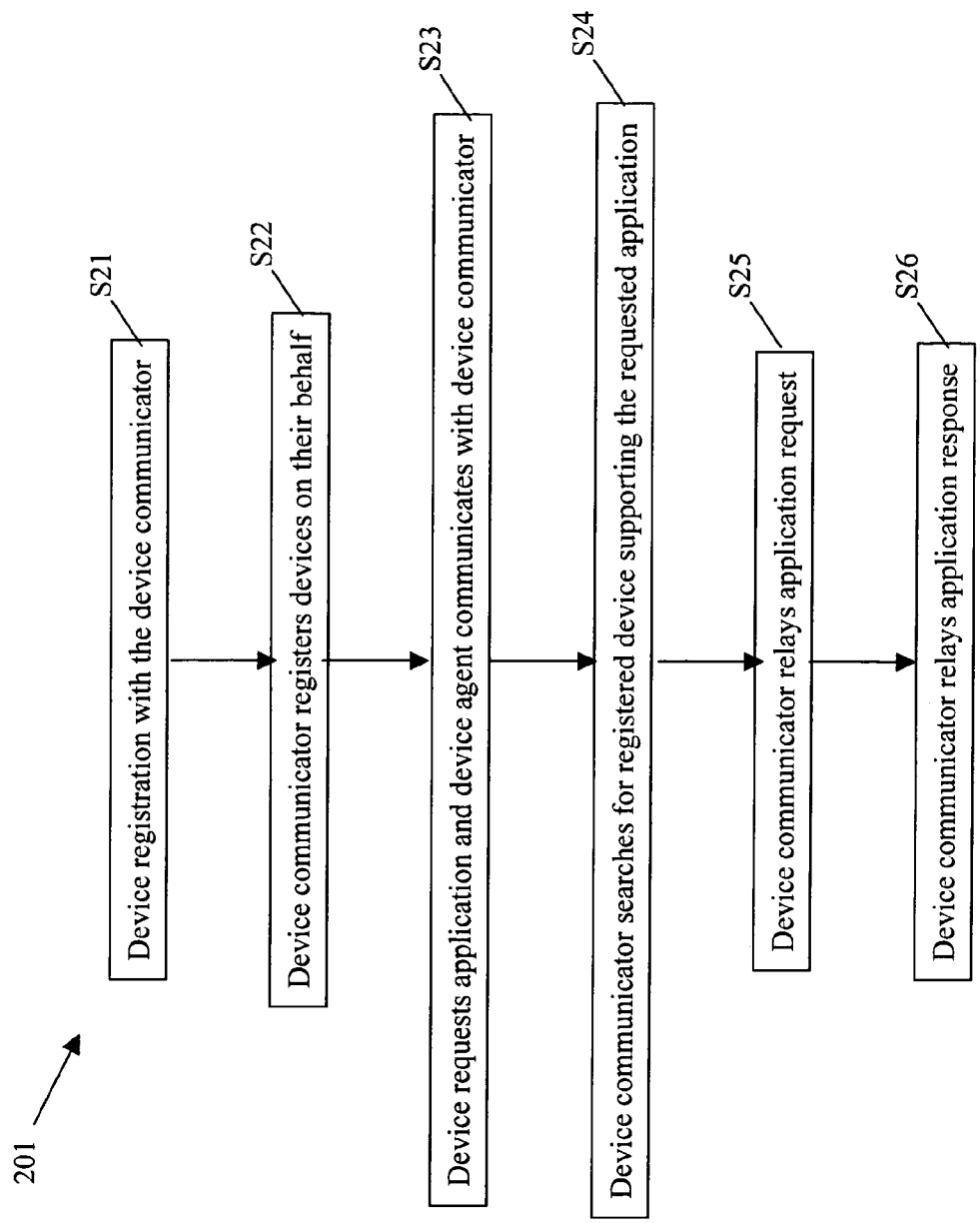
FIG. 2B shows another exemplary method according to the present invention.

FIG. 2B shows an exemplary method 201 according to the present invention. In step S21, one or more devices, such as, for example, a PDA and cellular telephone, request registration with the device communicator 104. In step S22, the device communicator 104 registers the devices, including their connectivity and protocol capabilities. During the registration, the device communicator 104 determines, for example, that the PDA supports IEEE 802.11b connectivity standard and the cellular telephone supports Bluetooth and SMS messaging. In step S23, a device (such as, for example, the PDA) may trigger an application supported by another device and the associated device agent communicates with the device communicator 104. For example, the PDA may trigger an application to send and receive SMS messages and the device agent associated with the PDA may send a message (behind-the-scene) to the device communicator 104. In step S24, the device communicator 104 receives the request and searches for a registered device that supports that application. For example, the device communicator 104 searches a device table and finds that the cellular telephone in the local area network is able to process SMS messages. In step S25, the device communicator 104 relays the application request. For example, the device communicator 104 may trigger the cellular telephone to send the SMS message. In step S26, the device communicator 104 forwards the application response to the requesting device. For example, the device communicator 104 may forward the SMS response message from the cellular telephone to the PDA. In this regard, the exemplary system may provide a transparent SMS service to the PDA. Hence, from the user point of view, the user is sending and receiving SMS messages from a PDA, but the PDA is not able to perform SMS messaging by itself. The technology is transparent and encourages the user to use the service more liberally, which may create greater revenue potential, which in turn may provide the benefit of generating new products and services, as well as other benefits.

The exemplary method 200 may be applied to document printing. For example, suppose a document is desired to be printed from a PDA to a network printer. Rather than downloading the document to a personal computer (PC) and triggering the print operation from the PC, a print request may alternatively be sent (using, for example, the IEEE 802.11b standard) to the device communicator 104 which may be installed in a local access point (a so-called "Hot Spot"). The device communicator 104 may then parse the input request and forward the document directly (e.g., via a wired network) to the network printer without going through the PC, thus providing anonymous services in a user transparent manner.

Figure 3:
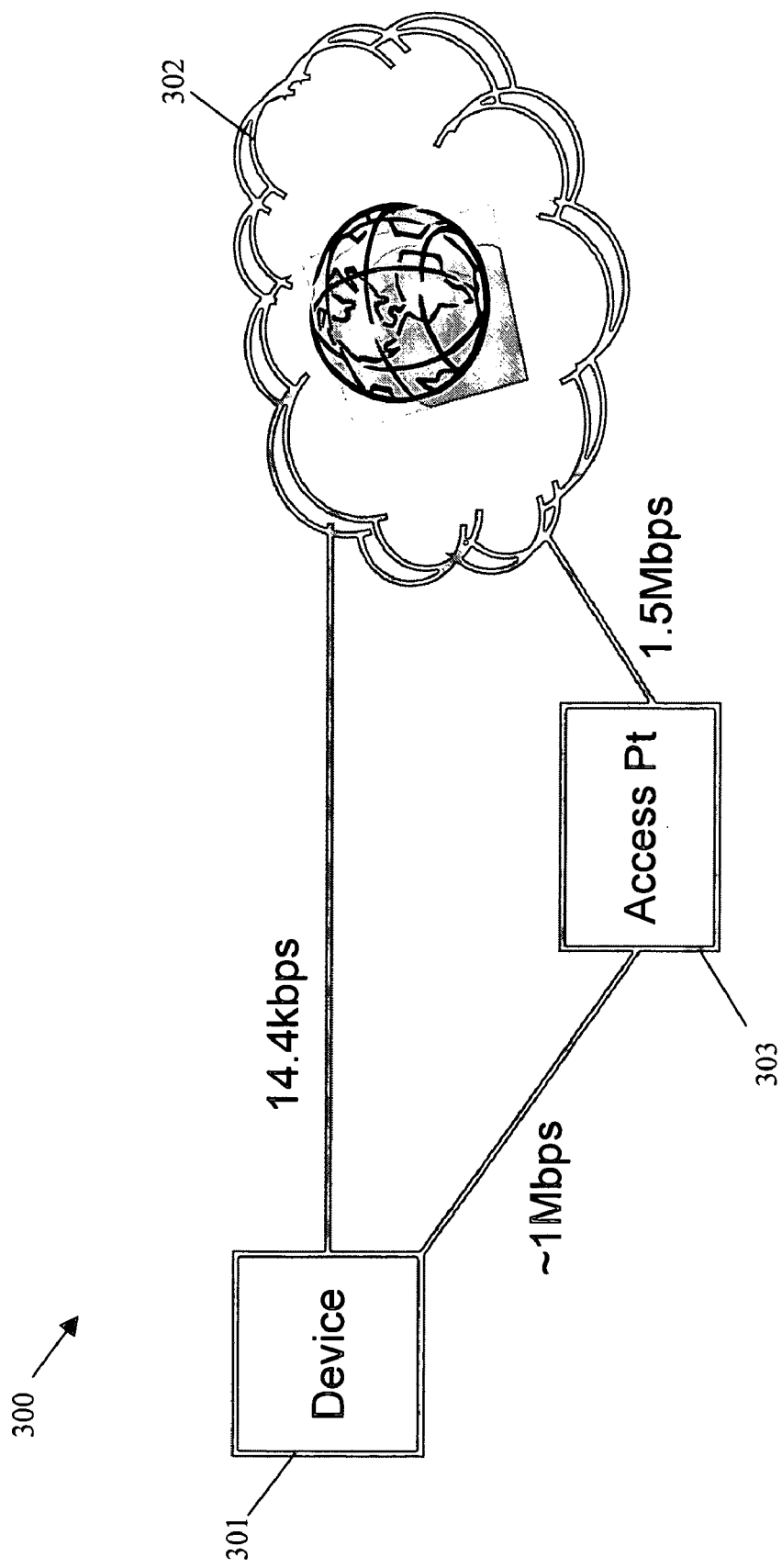
FIG. 3 shows an exemplary configuration for providing efficient bandwidth usage and improved network latency.

FIG. 3 shows an exemplary configuration 300 for providing efficient bandwidth usage and improved network latency. The exemplary configuration 300 includes a device 301 interconnected with the Internet 302 via a GPRS link supporting a data transfer rate of 14.4 kbps and with a device communicator at an access point 303 via a local area network using the Bluetooth standard, which supports a data transfer rate of approximately 1 MBps. The access point 303 is interconnected with the Internet via a link supporting a data transfer rate of 1.5 Mbps. The exemplary configuration 300 permits the device 300 to relay a service request to the Internet 302 through the access point 303 so as to provide a potential increase in data throughput and lower network latency.

The exemplary ASAP system may be based on a peer-to-peer (P2P) architecture rather than a client-server approach. In this exemplary architecture, each participating device, that is, each peer, belongs to a peer group, such as, for example, a local area impromptu network neighborhood formed by nearby devices through authentication and authorization. Each device has a device agent capable of communicating to a device communicator, residing, for example, on another device. The device communicator may also function as a device agent except that it may be additionally responsible for device synchronization, device registration, authentication, authorization, and obtaining services from service providers. The device communicator may aggregate the service requests from each device to form a single query and may be required to have a suitable connectivity/bandwidth to the service provider to obtain responses. To accommodate unreliable networks, the device communicator may also cache the requests and results so that if the devices become disconnected a reconnection and resend of the request may be performed. According to an exemplary embodiment, at least one device communicator should exist in the peer group. As devices join and leave the network, their roles may change. For example, a more capable (e.g., faster connectivity or higher computation power) device may become the device communicator and replace the existing one (see, for example, FIG. 4). The "hands-off" protocol should be transparent to other peers (devices). Hence, a flexible and dynamic network topology may be provided.

Figure 4:
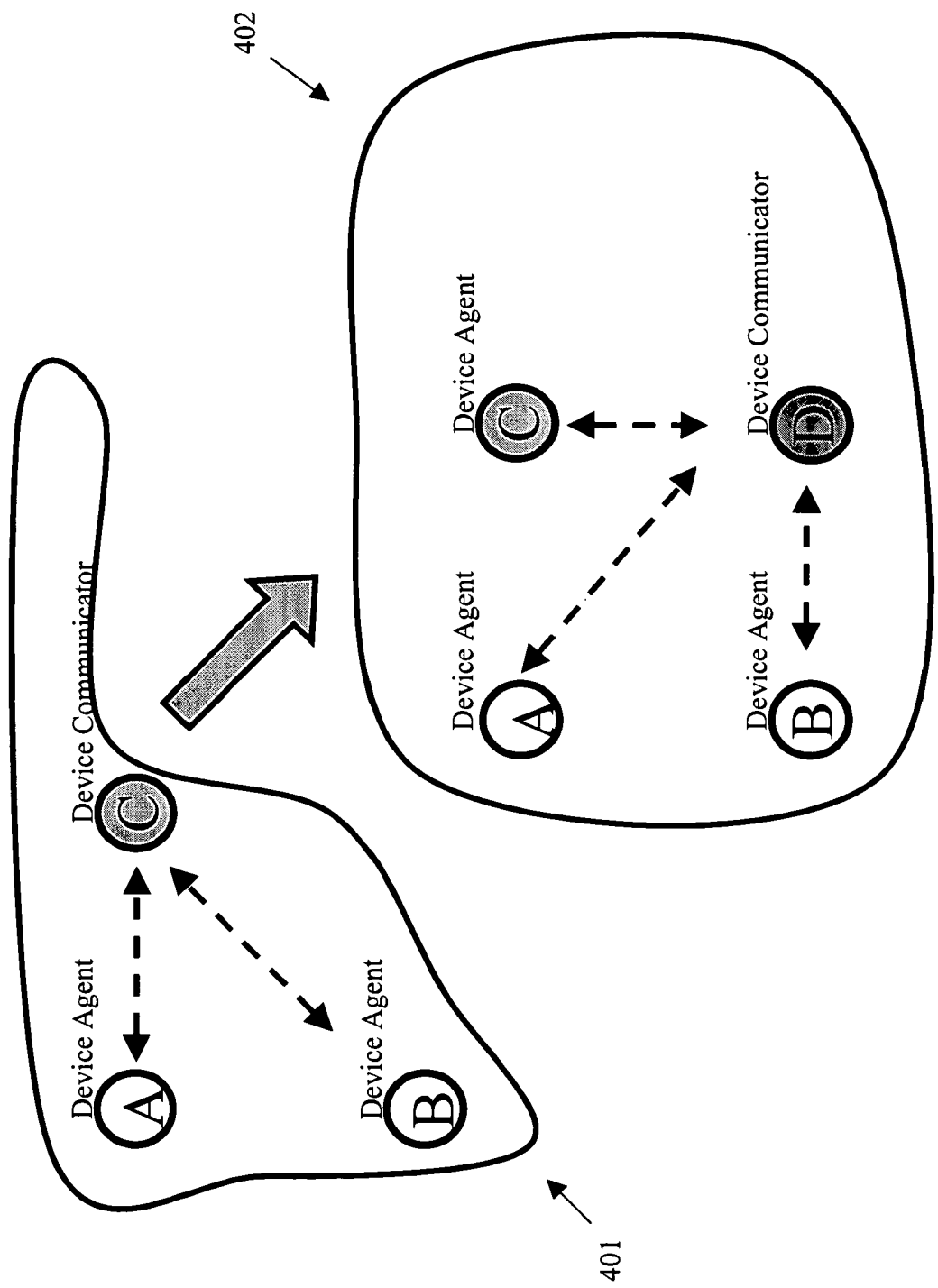
FIG. 4 shows an exemplary Automated Services to heterogeneous devices Across multiple Platforms (ASAP) network topology.

FIG. 4 shows an exemplary ASAP network topology, in which network devices may dynamically associate and dis-associate with the network. The exemplary network topology includes a first state 401 and a second state 402. In the first state 401 of the exemplary network, device C acts as device communicator to provide automated services to devices A and B, which act as device agents. In the second state 402 of the exemplary network, a more capable device D joins in and replaces device C as the device communicator so that device D performs computation and connectivity determinations for the other devices A, B, and C.

Figure 5:
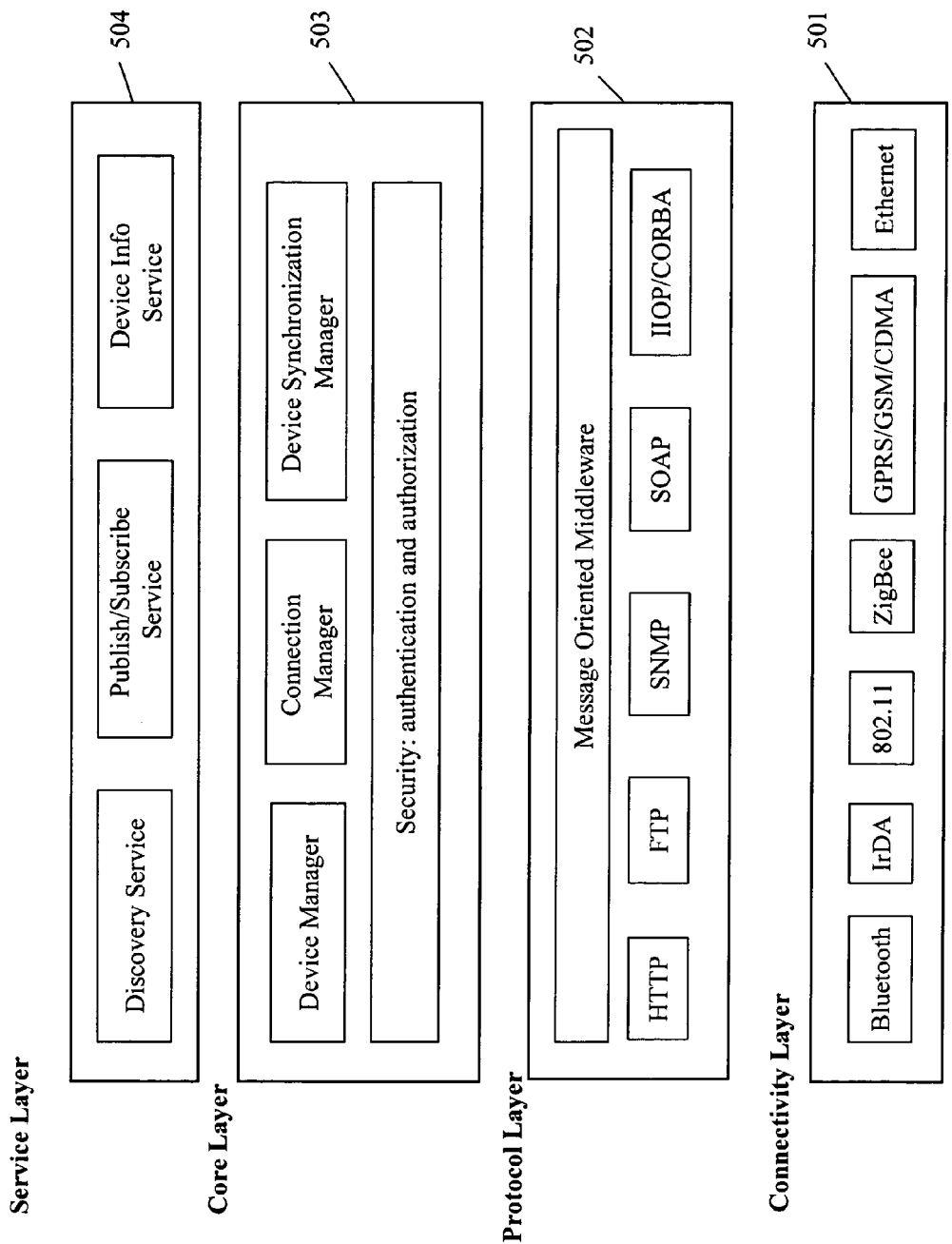
FIG. 5 shows an exemplary Automated Services to heterogeneous devices Across multiple Platforms (ASAP) architecture.

FIG. 5 shows an exemplary ASAP architecture 500 of four layers: a connectivity layer 501, a protocol layer 502, a core layer 503, and a service layer 504. The connectivity layer 501 provides connectivity support between devices, and includes, for example, such connectivity standards as Bluetooth, IrDA, 802.11 (WiFi), ZigBee, GPRS/GSM/CDMA, and Ethernet. In this regard, the device agent may support, for example, one connectivity standard while a device communicator should support multiple connectivity standards to serve more than one device. The protocol layer 502 provides protocol support for standardized and/or proprietary protocols, including, for example, HTTP, FTP, SNMP, SOAP, and IIOP/CORBA. The core layer 503 provides management, synchronization, and security including, for example, device management, connection management, device synchronization, authentication, and authorization. The service layer 504 provides application services, such as, for example, discovery, publication/subscription, and/or device information services.

Some of the services/standards/protocols associated with the layers may be supported only in the device communicator due to bandwidth and computational constraints. The device communicator 104 is responsible for connecting to the service provider. Thus, for example, the device communicator 104 may be required to support the HTTP or SOAP protocol while the device agent may support XML or CORBA. The core layer services are mainly components of device communicator as it manages the local device neighborhood, maintains a list of connections, and performs synchronization among the devices. Security is a core component in the core layer 503, as each device may be required to register with the device communicator through authentication and authorization.

Interprocess communication in a heterogeneous distributed environment may require support for different language bindings (e.g., C, C++, Java, etc.), different protocols (e.g., HTTP, IIOP, RMI, HTTPS, SOAP, XML, XML-RPC, etc.) and different frameworks (e.g., CORBA, OS sockets, JMS, Java object serialization, etc). To alleviate the burden of application programmers, who may write components for the system, a lightweight layer is provided which abstracts or simplifies the networking and system issues for efficient communication. Instead of producing wrappers/adapters for each module for each protocol to communicate to other modules, which may be tedious and prone to errors, a simplified application programming interface (API) may be provided to make all this communication transparent. To support the requirements mentioned above, a Message Oriented Middleware (MoM) may be provided in the protocol layer 502.

The Message Oriented Middleware (MoM) may be implemented as software that runs continuously (e.g., acting as a server middleware) to regulate and facilitate the exchange of messages between publishers (those who "announce") and subscribers (those who "listen"). The message may be described with XML-encoded Meta information. Message data may include simple ASCII text, GIF images, XML data, Java objects, or any binary-encoded data. Other protocols, such as, for example, E-mail or SOAP may be plugged in later without making any changes in the client code. The MoM may hide much of the networking protocol and operating system issues, which should alleviate the burden of maintaining socket communication and session management from programmers.

The service layer 504 may allow applications to be written quickly by leveraging the ASAP platform. The discovery service module allows a device agent to discover a device communicator and setup a connection for service request/response and synchronization. A device information service provides information regarding device capabilities so that a service request from multiple devices may be aggregated. In this regard, application developers may focus on service-oriented business logic rather than setting up/maintaining network connections and synchronizing devices.

FIG. 6 shows pseudo-code to implement an exemplary subscriber/publisher control flow.

Figure 7:
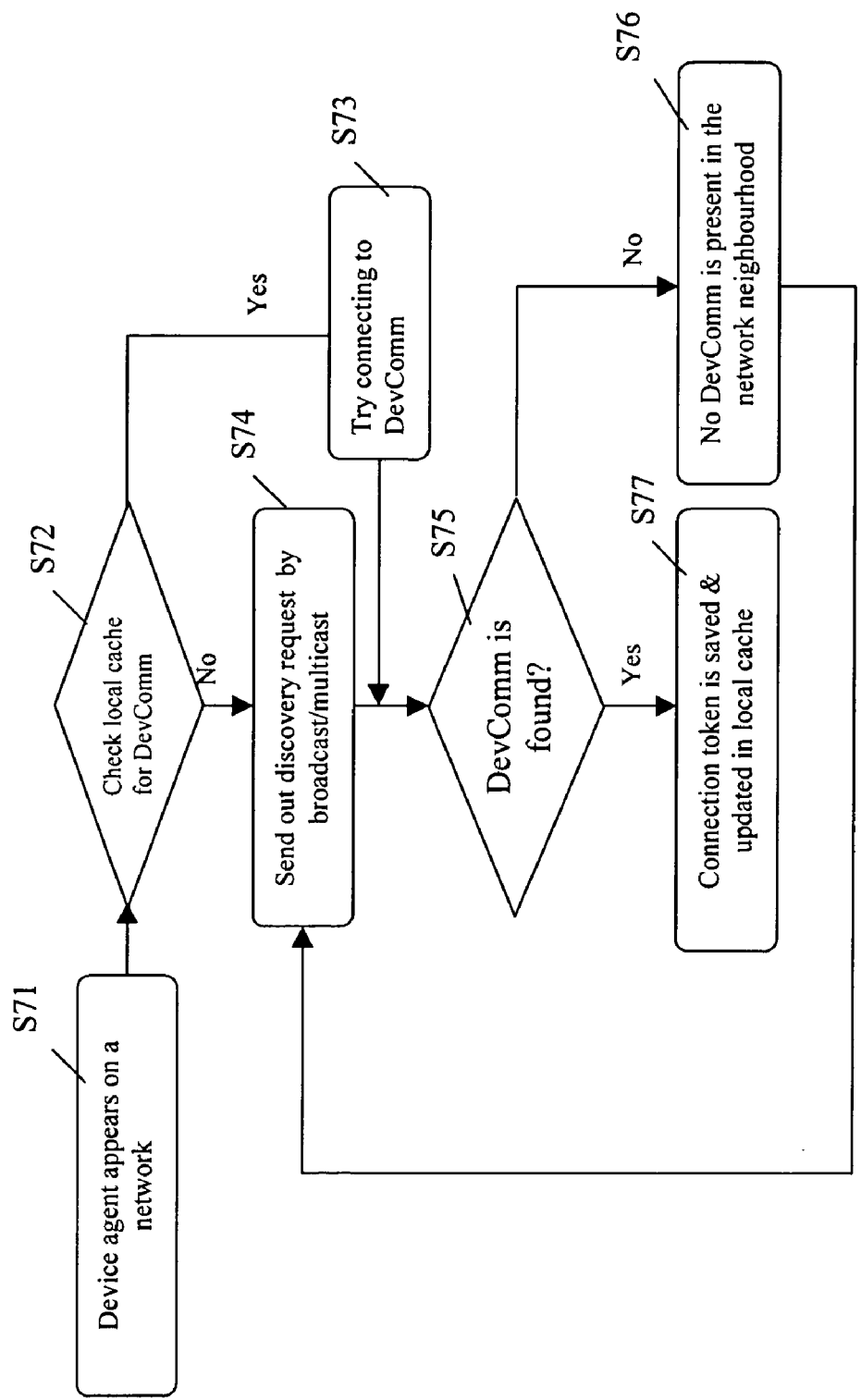
FIG. 7 shows a flow chart for an exemplary device discovery.

FIG. 7 shows a flow chart for an exemplary method for discovering a device with an environment providing Automated Services Across multiple Platforms (ASAP). In step S71, a device agent first appears on a network. In step S72, device agent searches the local cache for information regarding the device communicator. If the information is found, then in step S73, the device attempts to contact the device communicator and setup a connection. Otherwise if the information is not found, then in step S74, a discovery request is sent. In a TCP/IP environment, for example, the discovery request may be sent via a broadcast or a multicast. In this regard, the device agent sends out a discovery request and all the devices in the network neighborhood should receive the message and respond appropriately. In step S75, the device agent examines the responses to determine and/or confirm the device communicator. If the device agent does not discover the device communication, in step S76, the system assumes that there is no device communicator in the network neighborhood at the present time and the sending out a discovery request is repeated. Otherwise, if the device agent discovers the device communicator, in step S77, the connection token is saved (an XML message that tells where the device communicator is located and how to contact it) in the cache for later usage. The cache may allow for faster discovery but it may also expire due to the feature that devices may join and leave the network. Therefore a time-to-live (TTL) may be attached so that after a certain period the cached data may be considered expired. A check may also be preformed to ensure that the device exists before a network connection is initiated The exemplary ASAP system may provide publishing services. For example, when a device agent requests a service, it may publish a service request to the device communicator, which is thereafter referred to as a token. The token is a container that may be passed from a device agent to the device communicator and vice versa. To provide a generalized format, XML may be used to provide an easily expandable and hierarchical representation. XML may also be used to aggregate information from other agents and send back results from service providers to device agents via device communicator.

An exemplary ASAP system may aggregate the requests of the multiple devices. For example, to serve a service request, aggregate information may be required to be provided by the devices. Since each device may have different capabilities, a new request may be required to be constructed on behalf of the device that initiated the service. As explained in the PDA example, the cellular telephone capabilities and PDA functions may be combined to complete the request. Unlike a client-server model, which may require users to perform all the steps above to acquire different information from each device, type them in the web browser, and read the results back, an exemplary ASAP system uses a peer-to-peer approach where each device is coordinated by the device communicator and thus facilitates the service-oriented architecture.

An exemplary ASAP system may also provide subscription services. For example, in a publish/subscribe model, multiple devices may subscribe to an interested event (e.g., calendar event) even when only one device makes the request. In this regard, the devices that demonstrate their interest in certain events may be updated without overwhelming the network with redundant packets. During the subscription, the device may also mention the priority that provides more efficient access (e.g., the device communicator may batch up the results in a single send rather than updating each device for each request). This may provide the benefit of optimizing the network usage as well as reducing the latency.

As mentioned in the subscribing events description, when the results come back, the device communicator may also synchronize the devices in the network neighborhood to keep them up-to-date. In this regard, users may not need to synchronize devices explicitly.

Figure 8:
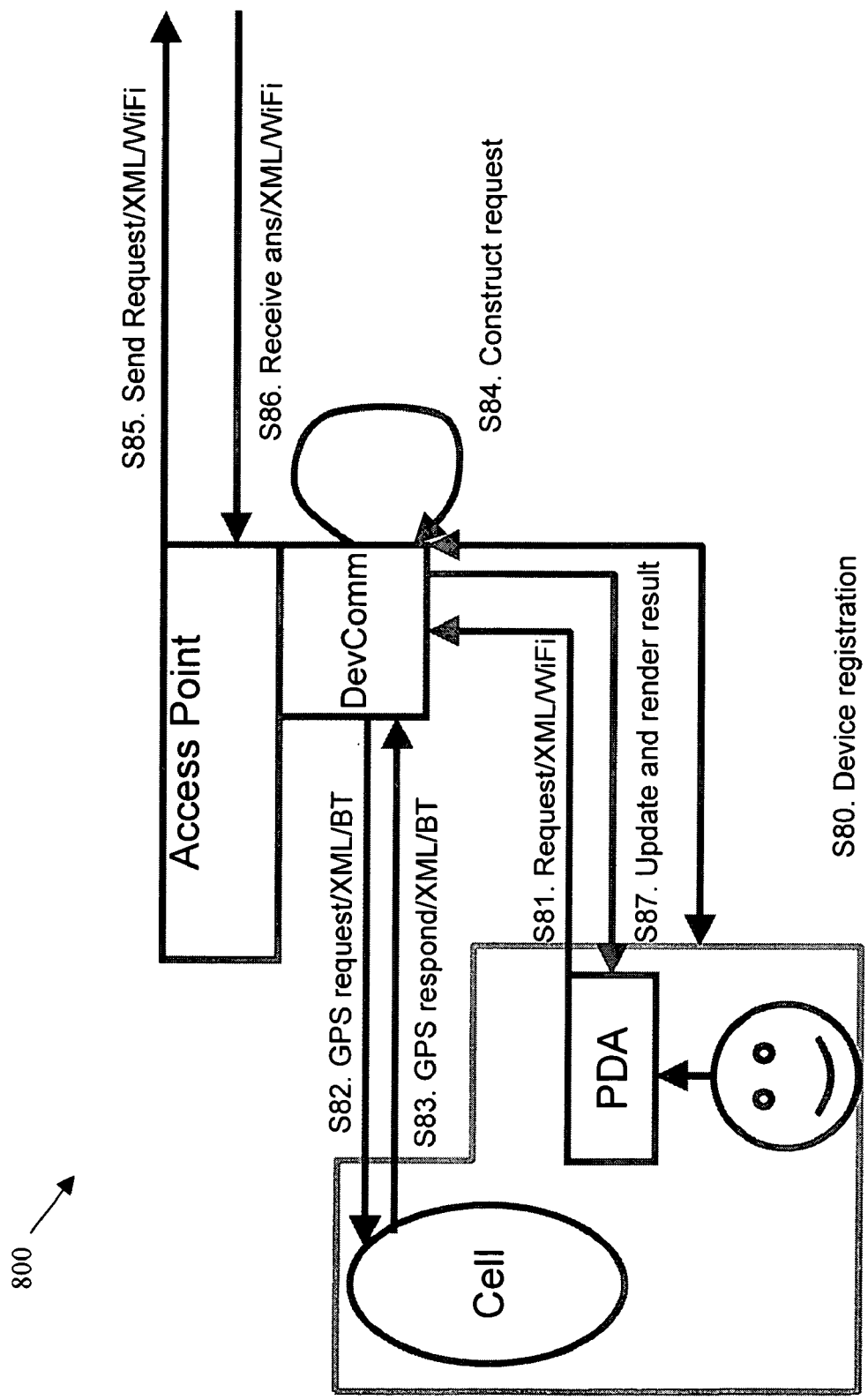
FIG. 8 shows an exemplary method to order a movie ticket from a nearby movie theater and obtain directions to the movie theater using the Automated Services to heterogeneous devices Across multiple Platforms (ASAP).

FIG. 8 shows an exemplary method 800 to order a movie ticket from a nearby movie theater and obtain directions to the movie theater. In step S80, a device registration occurs. The registered device may include, for example, a PDA, cellular telephone, or combination thereof. In step S81, a request message is sent from the PDA device to the device communicator using a locally supported format, such as, for example, XML via WiFi. In step S82, the device communicator sends a request message to the cellular telephone device in a format support by the cellular telephone, such as, for example, XML via Bluetooth, to identify its geographic location. In step S83, the cellular telephone device, equipped with a GPS, responds to the request. In step S84, the device communicator constructs a request using the information supplied from the PDA and cellular telephone devices. In step S85, a request is sent to an appropriate server via an access point. In step S86, the access point receives a response from the appropriate server and forwards it to the device communicator. In step S87, the device communicator sends a result to the PDA device.

Figure 9:
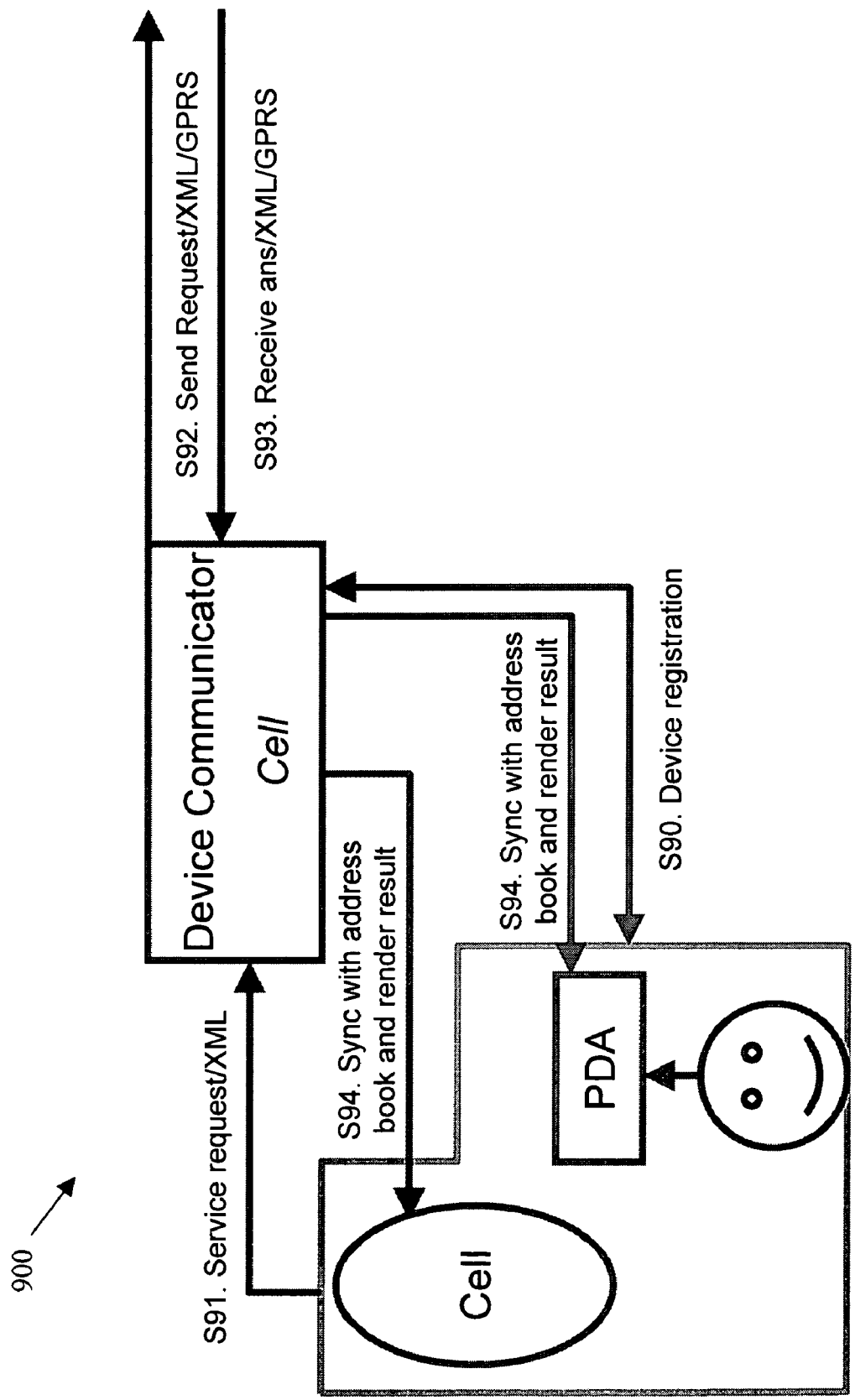
FIG. 9 shows an exemplary method to obtain directions using a voice interface of a cellular telephone device Automated Services to heterogeneous devices Across multiple Platforms (ASAP).

FIG. 9 shows an exemplary method 900 to obtain directions using a voice interface of a cellular telephone device. In step S90, device registration occurs. The registered device may include, for example, a PDA, cell phone, or combination thereof. In step S91, the cellular telephone device sends a service request message to the device communicator in a locally supported format (such as, for example, XML). In step S92, the device communicator sends a request to an appropriate provide in a suitable format (such as, for example, XML) via GPRS. In step S93, the device communicator receives an answer. In step S84, the cellular telephone device and PDA device are synchronized with address information related to the request.

Figure 10A:
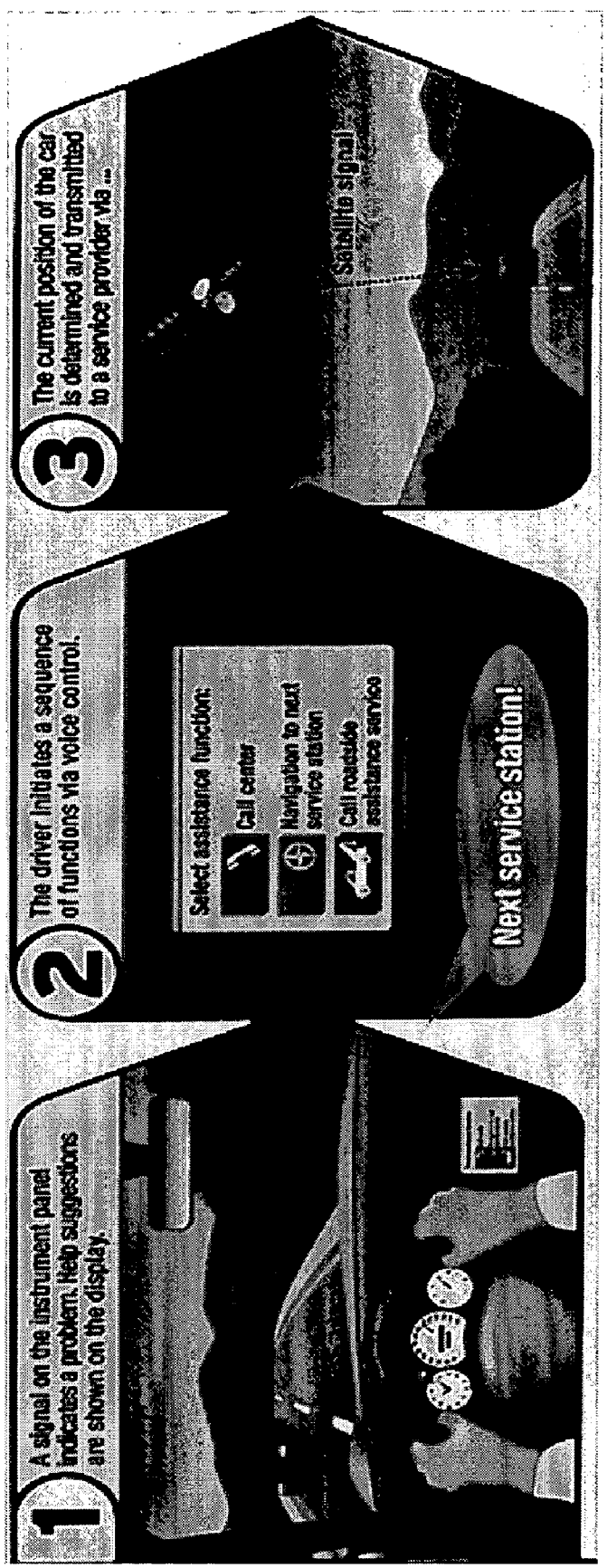
FIGS. 10A shows steps 1 through 3 of an exemplary method for a voice interactive vehicle assistance application.
Figure 10B:
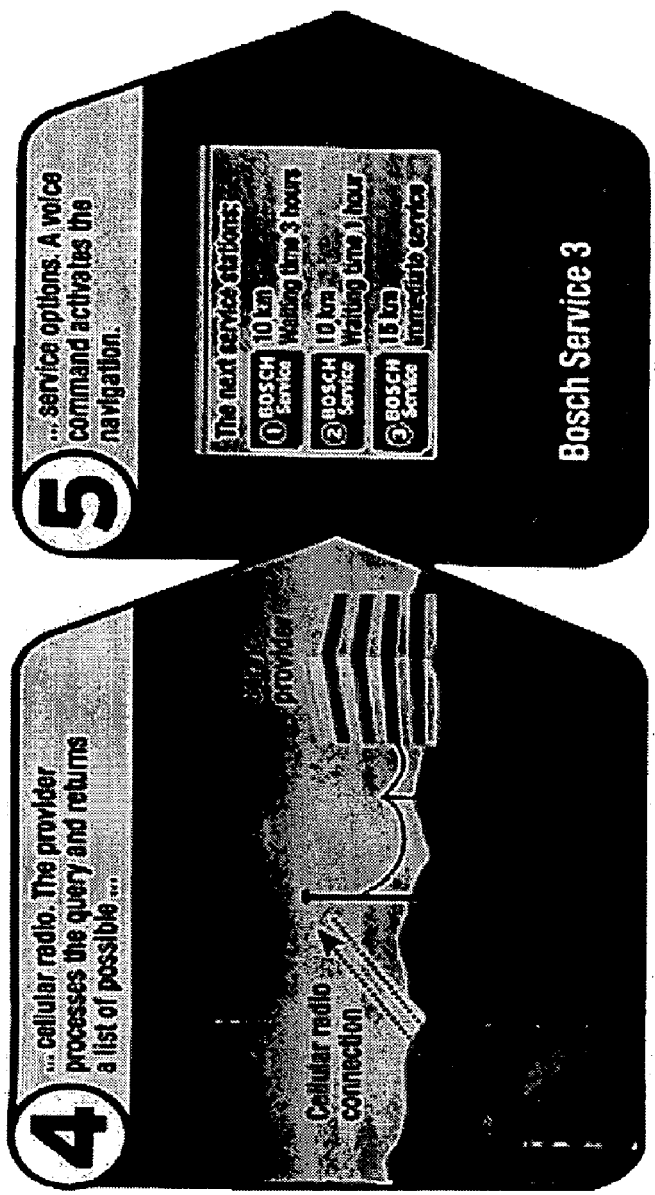
FIG. 10B shows steps 4 and 5 of an exemplary method for a voice interactive vehicle assistance application.

FIGS. 10a and 10b show an exemplary method for a voice interactive vehicle assistance application. In step 1, a signal on the instrument panel indicates a problem and help suggestions are shown on a display. In step 2, the driver initiates a sequence of functions via voice control. In step 3, the current position of the car is determined and transmitted to a service provide via a cellular radio. In step 4, the provider processes the query and returns a list of possible service options. In step 5, a voice command activates the navigation.

Figure 11:
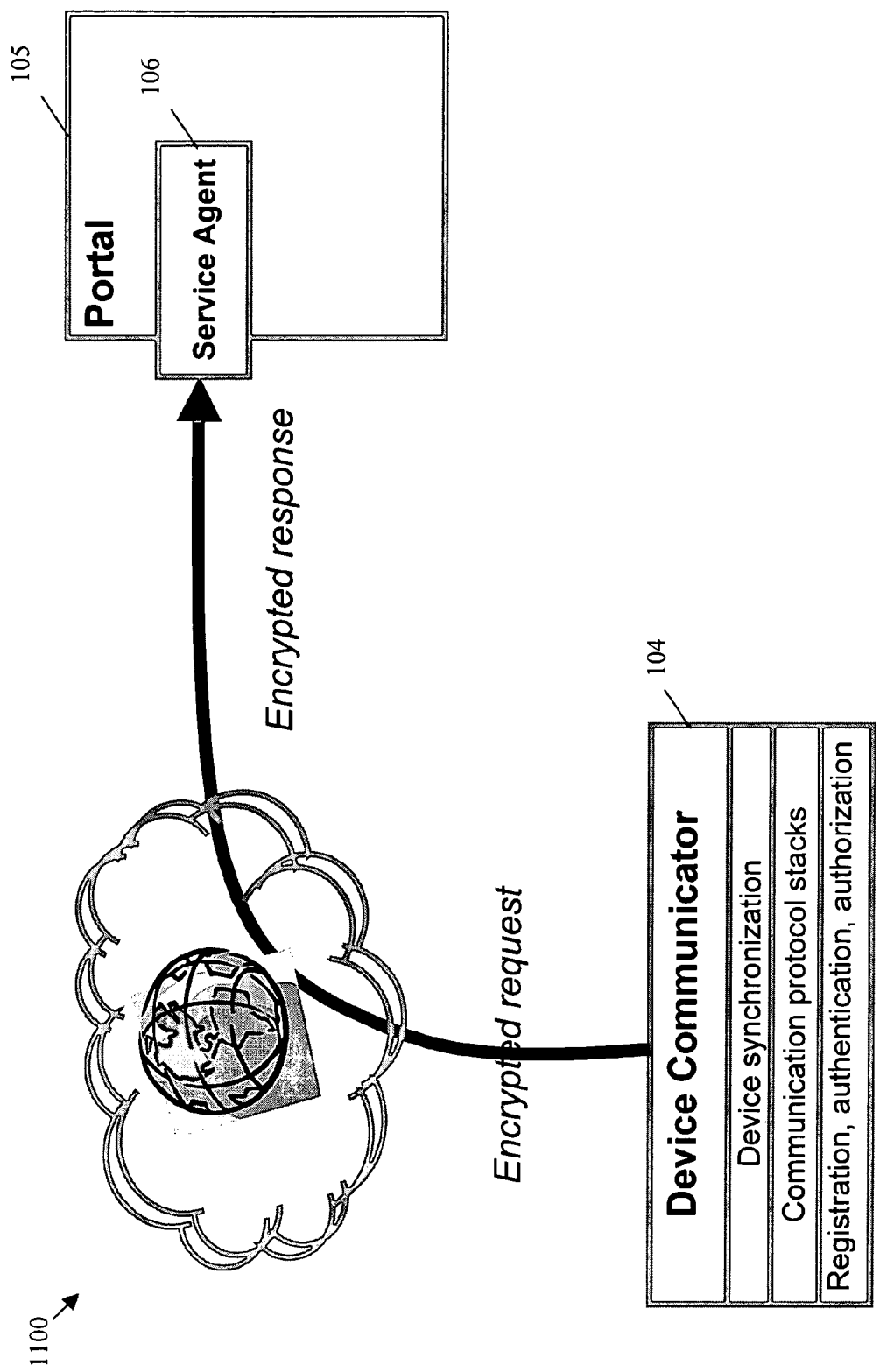
FIG. 11 shows an exemplary encryption scheme to enhance security.

FIG. 11 shows an exemplary encryption scheme 1100 to enhance security, in which a device communicator 104 sends an encrypted request via a network to a service agent 106 of portal server 105.

What is claimed is:

1. A system to provide automated services to heterogeneous devices in a network environment, comprising:
   a device agent residing on each of the heterogeneous devices;
   a device communicator to register and synchronize the devices via each of the device agents; and
   a portal server to interface multiple content sources on behalf of the devices;
   wherein:
      the devices communicate with the portal server via each of the device agents and the device communicator;
      the registration of the heterogeneous devices by the device communicator includes the device communicator recording in a device table a list of applications supported by at least one of the heterogeneous devices;
      a first one of the heterogeneous devices triggers the device agent residing on the first heterogeneous device to send a request for an application;
      the device agent residing on the first heterogeneous device responsively transmits the request to the device communicator;
      the device communicator searches the device table to locate a second one of the heterogeneous devices that supports the application;
      the device communicator forwards the request to the second heterogeneous device;
      responsive to the forwarded request, the second heterogeneous device transmits a response to the device communicator; and
      the device communicator forwards the response to the first heterogeneous device.

2. The system of claim 1, wherein at least two of the devices support different protocols and connectivities.

3. The system of claim 1, wherein the devices include at least one of a desktop computer, a laptop computer, a wireless device, a personal data assistant, a handheld GPS unit, an in-car navigation system, a cellular telephone, a digital camera, a MP3 player, a digital video recording device, a printer, and a home appliance having a processor.

4. The system of claim 1, wherein the services include at least one of downloading data and providing data synchronization.

5. The system of claim 1, wherein the services include at least one of locating a service provider, ordering at least one of a product and a service, purchasing at least one of the product and the service, locating a nearby service establishment, downloading information, and updating information.

6. The system of claim 1, wherein the network environment includes at least one of a wired connection and a wireless connection.

7. The system of claim 1, wherein the network environment includes at least one of a personal area network, a local area network, and a wide area network.

8. The system of claim 1, wherein the device agent provides a single unified messaging interface.

9. The system of claim 8, wherein the single messaging interface is one of an XML interface and a compressed XML interface.

10. The system of claim 9, wherein the single unified messaging interface allows future expansion capabilities without a fixed binding of a function call for an application programming interface.

11. The system of claim 1, wherein the device communicator is configured to store device capabilities during a registration of the devices.

12. The system of claim 11, wherein the device capabilities include a connectivity capability.

13. The system of claim 12, wherein the connectivity capability includes at least one of a ZigBee, a Bluetooth, an IrDA, a GPRS, a GSM, a CDMA, and an Ethernet capability.

14. The system of claim 11 wherein the device capabilities include at least one supported protocol.

15. The system of claim 14, wherein the at least one supported protocol includes at least one of HTTP, FTP, SNMP, SOAP, XML, RMI, and IIOP/CORBA.

16. The system of claim 11, wherein the device capabilities include at least one of a memory size, a screen size, a computing power, a storage capability, an audio capability, and a video capability.

17. The system of claim 1, wherein the device communicator is configured to deliver software updates to the devices via the device agent.

18. The system of claim 1, wherein the device communicator is configured to deliver the software updates when the device is available.

19. The system of claim 1, wherein the portal server is configured to at least one of aggregate and cache data from the multiple content sources.

20. The system of claim 1, wherein the portal server is configured to maintain data persistency so that devices that are not always on have access to a most recent snapshot.

21. The system of claim 1, wherein at least one of the multiple content sources resides on a wide area network.

22. The system of claim 1, wherein the at least one of the multiple content sources resides on the Internet.

23. The system of claim 1, wherein the device communicator resides on one of the heterogeneous devices.

24. The system of claim 23, wherein the heterogeneous devices are arranged as a peer-to-peer (P2P) network.

25. A method to provide automated services to heterogeneous devices in a network environment across multiple platforms, comprising:
providing a single messaging interface on each device via a device agent, which communicates with a device communicator via a device-specific connectivity and communication protocol;
registering each of the devices via the device communicator to record device capabilities of each of the devices;
aggregating data from multiple content sources via a portal server; caching the data; and
downloading and synchronizing the data via the device communicator;
wherein:
the registration of the heterogeneous devices by the device communicator includes the device communicator recording in a device table a list of applications supported by at least one of the heterogeneous devices;
a first one of the heterogeneous devices triggers the device agent residing on the first heterogeneous device to send a request for an application;
the device agent residing on the first heterogeneous device responsively transmits the request to the device communicator;
the device communicator searches the device table to locate a second one of the heterogeneous devices that supports the application;
the device communicator forwards the request to the second heterogeneous device;
responsive to the forwarded request, the second heterogeneous device transmits a response to the device communicator; and
the device communicator forwards the response to the first heterogeneous device.

26. The method of claim 25, further comprising:
issuing a service request via the single messaging interface;
sending the request from the device agent to the device communicator;
modifying the request to conform to the network environment;
forwarding the request to a service provider via the portal server; and
receiving a reply from the service provider via the portal server.

27. A system to provide automated services to heterogeneous devices in a network environment across multiple platforms, comprising:
a single messaging interface on each device via a device agent which communicates with a device communicator via a device-specific connectivity and communication protocol;
an arrangement to register each of the devices via the device communicator to record device capabilities of each of the devices;
an arrangement to aggregate data from multiple content sources via a portal server;
an arrangement to cache the data; and
an arrangement to download and synchronize the data via the device communicator;
wherein:
the registration of the heterogeneous devices by the device communicator includes the device communicator recording in a device table a list of applications supported by at least one of the heterogeneous devices;
a first one of the heterogeneous devices triggers the device agent residing on the first heterogeneous device to send a request for an application;
the device agent residing on the first heterogeneous device responsively transmits the request to the device communicator;
the device communicator searches the device table to locate a second one of the heterogeneous devices that supports the application;
the device communicator forwards the request to the second heterogeneous device;
responsive to the forwarded request, the second heterogeneous device transmits a response to the device communicator; and the device communicator forwards the response to the first heterogeneous device.

28. The system of claim 27, further comprising:

an arrangement to issue a service request via the single messaging interface;

an arrangement to send the request from the device agent to the device communicator;

an arrangement to modify the request to conform to the network environment;

an arrangement to forward the request to a service provider via the portal server; and an arrangement to receive a reply from the service provider via the portal server.

* * * * *